US005257866A

United States Patent [19]

Rennerfelt

[11] Patent Number: 5,257,866

[45] Date of Patent: Nov. 2, 1993

[54] BEARING DEVICE FOR SIDE REGISTER

[76] Inventor: Gustav Rennerfelt, Nilstorpsvägen 53, Lidingö , Sweden, S-181 47

[21] Appl. No.: 930,438

[22] PCT Filed: Feb. 27, 1991

[86] PCT No.: PCT/SE91/00159

§ 371 Date: Sep. 22, 1992

§ 102(e) Date: Sep. 22, 1992

[87] PCT Pub. No.: WO91/16201

PCT Pub. Date: Oct. 31, 1991

[30] Foreign Application Priority Data

Apr. 24, 1990 [SE] Sweden ............................... 9001477

[51] Int. Cl.[5] ........................ F16C 23/00; F16C 23/06

[52] U.S. Cl. .................................. 384/247; 384/583; 384/616

[58] Field of Search ................................ 384/247-251, 384/252, 255, 256, 519, 583, 616

[56] References Cited

U.S. PATENT DOCUMENTS

| | | | |
|---|---|---|---|
| 1,839,497 | 1/1932 | Peterson | 384/251 |
| 1,910,857 | 5/1933 | Pizzini | 384/616 |
| 2,326,180 | 8/1943 | Stempel | 384/616 |
| 2,581,455 | 1/1952 | Stempel | 384/616 X |
| 3,331,318 | 7/1967 | Augustyn et al. | 384/583 X |
| 3,545,827 | 12/1970 | McDermott | 384/256 |
| 4,760,789 | 8/1988 | Witczak | 384/583 X |

FOREIGN PATENT DOCUMENTS

| | | |
|---|---|---|
| WO8805508 | 7/1988 | PCT Int'l Appl. . |
| WO8805509 | 7/1988 | PCT Int'l Appl. . |

*Primary Examiner*—Thomas R. Hannon
*Attorney, Agent, or Firm*—Young & Thompson

[57] ABSTRACT

A bearing structure is provided for a linear adjusting device (15) for a cylinder such as, for example, a plate cylinder (3) of a printing press. A linear adjusting device has an outgoing linearly adjustable shaft (16) and is coupled to one of the journals (8).

16 Claims, 4 Drawing Sheets

13
14
L''
7
L'
9
11
22B
5
22A
3
8
10
17
16
20
18
L''
1
4
12
21
19
15
L'
2

3

D
B
8
10
17
16
20
15
18
12
L''
C
15'
L'
A
21
19
23
22

BEARING DEVICE FOR SIDE REGISTER

TECHNICAL FIELD

The invention refers to a bearing device for a linear adjusting device, preferably a side register or side lay of a cylinder, preferably a plate cylinder of a printing press.

A printing press comprises several plate cylinders onto which curved printing plates are mounted. It is important that all printing plates have the same orientation so that the pictures imprinted by the printing plates on a running paper web lie in a straight line behind each other. If a printing plate on a plate cylinder has an oblique position in relation to a printing plate on another plate cylinder, the first-mentioned plate cylinder may be tilted, so-called cocking adjustment, to eliminate the tilting of the printing plate.

In a printing press it is also desirable to adjust the plate cylinder in the axial direction, so-called side adjustment, to cause the printed pictures to lie exactly in line with each other. Here it is a question of small axial movements of an order of magnitude of centesimals of a millimeter.

In a printing press it may also be necessary to shift a plate cylinder in a direction at right angles to its longitudinal axis, so-called impression on/off adjustment. Such shifting movement is performed, for example, when it is intended to change from printing to non-printing. In the non-printing position it is for example possible to mount the printing plates on the plate cylinder.

STATE OF THE ART

In order to perform lateral adjustment of the plate cylinder a so-called side register or side lay is used at present. In order to perform the cocking adjustment a supple shaft inserted between the side register and the journal of the plate cylinder is used. The supple shaft permits inclination of the plate cylinder due to the flexibility of the supple shaft. However, there is a problem due to the fact that the supple shaft also is suppled axially and thus produces undesirable lateral shifting of the plate cylinder.

Rather than using a supple shaft, a bulky cylindrical shaft may be used provided with cardan joints, one at each end.

However, both the supple shaft and the bulky shaft provided with cardan joints lack satisfactory axial stiffness. As mentioned above, an adjustment exactitude of one centesimal of a millimeter is required, taking into consideration that the plate cylinders are large and heavy and expose the bearings, side registers and intermediate shafts to very large dynamic forces.

REVIEW OF THE INVENTION

It is the purpose of the invention to bring about an axially very stiff transmission between the plate cylinder and the side register. The device according to the invention is intended to permit both cocking adjustment and impression on/off adjustment of the plate cylinder while maintaining the mentioned high stiffness requirement in connection with the lateral adjustment of the plate cylinder by means of the side register.

The features characterizing the invention appear from the attached claims.

No refractive forces should be introduced into the axial bearings of the side register.

DESCRIPTION OF THE DRAWINGS

The invention will be described in detail hereafter by reference to the attached drawings in which.

DESCRIPTION OF A PREFERRED EMBODIMENT

Figure 1:
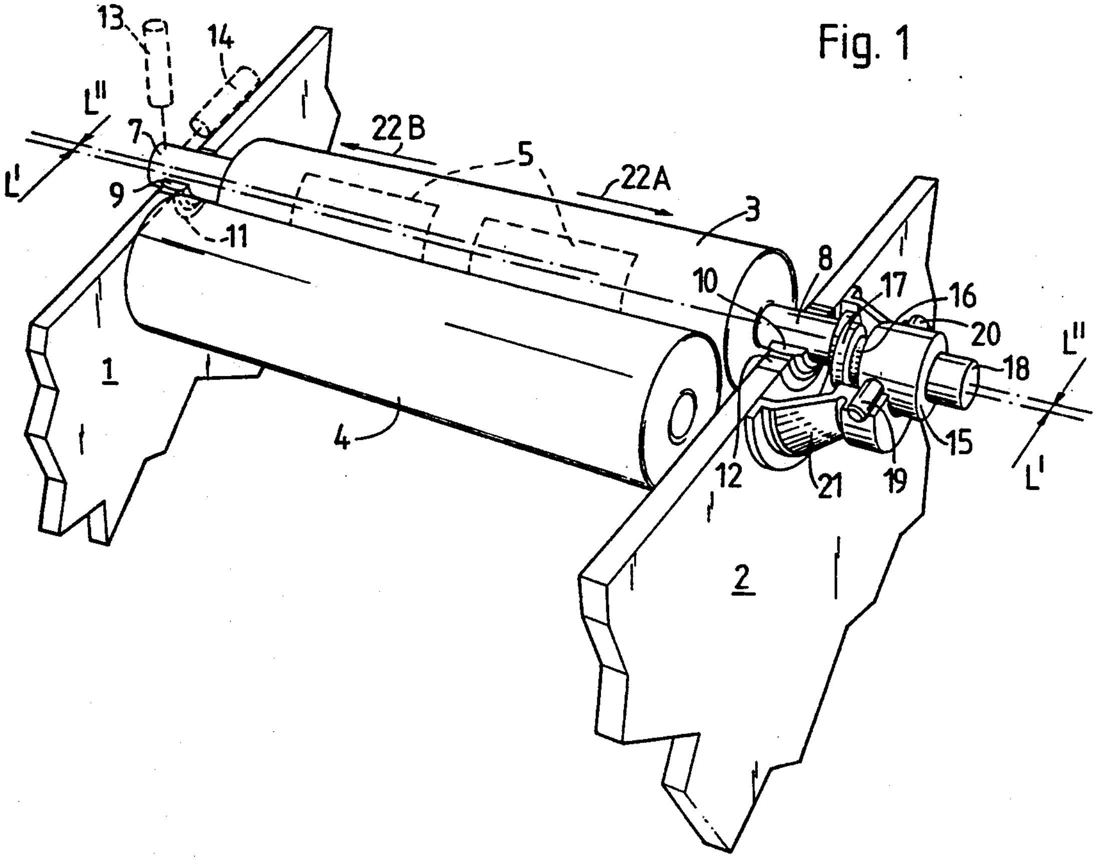
FIG. 1 is perspective view of a pair of cylinders where one of the cylinders, the plate cylinder, at its one end is connected to a side register, the plate cylinder being in the adjustment position "impression-off"

FIG. 1 represents a cylinder stand comprising two side walls 1, 2. A plate cylinder 3 and a rubber cylinder 4 form a pair of cylinders which is supported in the side walls of the cylinder stand. Schematically shown printing plates 5 are attached to the surface of the plate cylinder. The plate cylinder 3 has two journals 7, 8 which by means of spherical bearings 9, 10 each are eccentrically supported in eccentrically mounted ring means, numbered respectively 11 and 12. Each ring means is rotatably positioned in an opening in the side wall 1, 2 in question.

The rubber cylinder 4 is only schematically shown and is also provided with journals which are supported in the side walls 1, 2 in conventional bearings lacking said eccentrically mounted ring means. The rubber cylinder 4 is stationarily supported in the cylinder stand and cannot be adjusted in the same way as the plate cylinder.

By means of schematically indicated hydraulic cylinder units 13, 14 the journal 7 may be displaced in either vertical or horizontal direction. A hydraulic cylinder unit corresponding to unit 14 is also to be found at the journal 8 but is not shown in the Fig. However, there is no counterpart of the hydraulic cylinder unit 13 at the journal 8.

Figure 7:
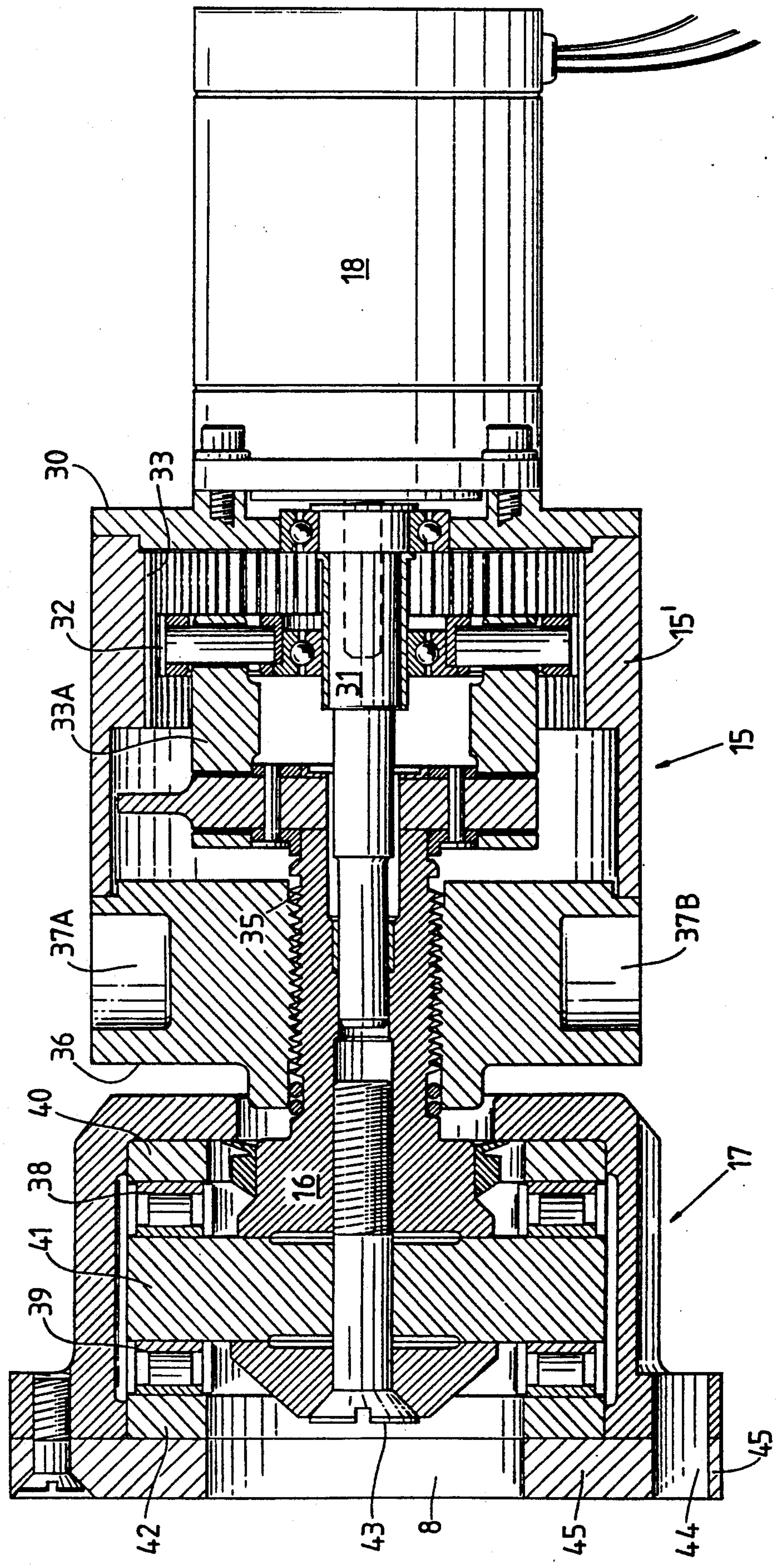
FIG. 7 is a view in longitudinal section of the side register shown in FIGS. 1-5.

A side register 15 has an outgoing shaft 16 to which a double-acting, radially floating thrust bearing 17 is attached. Thrust bearing 17 is in turn screwed to the journal 8. Within the side register the gear mechanism shown in FIG. 7 is disposed. The gear mechanism has an in- and outgoing shaft. The ingoing shaft is rotated by an electric motor 18 the rotationary movement of which is transformed into an axial movement of the outgoing shaft of the gear mechanism which in turn shifts the outgoing shaft 16 of the side register in an axial direction. The side register 15 is pendulum suspended by means of pivots 19, 20 in holding means 21 screwed to the side wall 2. The pivotal axis A-B of the side register extends in parallel to the connecting line between the centre of the cylinders.

There is no corresponding structure comprising a side register, axial bearing and holder at the opposite journal 7.

By activating motor 18 of the side register causing the motor to rotate in a clockwise direction the side register 15 is able to draw the plate cylinder 3 at the journal 8 such as to move the plate cylinder in the direction of arrow 22A. By causing motor 18 to rotate in the counter-clockwise direction the side register 15 shifts the plate cylinder 3 in the opposite direction indicated by arrow 22B. This axial shifting movement should be performed with very high precision of an order of magnitude of some few centesimals of a millimeter. It is thus obvious that the axial bearing should have the smallest possible axial play, preferably no play at all. In order to obtain optimal stiffness in the axial bearing it is pretensioned.

In FIG. 1 the envelope surface of the plate cylinder is not in contact with the envelope surface of the rubber cylinder 4. This corresponds to the adjustment position impression-off. By synchronous activation of the hydraulic cylinder aggregate 14 at the journal 7 and the corresponding hydraulic cylinder aggregate (not shown) at the journal 8 the position of the axial line L″—L″ of the plate cylinder can be shifted in parallel to the position L′—L′ in which the envelope surface is in contact with the envelope surface of the rubber cylinder. The last-mentioned position corresponds to the adjustment position impression-on. During this synchronous activation of the hydraulic cylinder aggregates the eccentrically mounted ring means 11, 12 are rotated and the journal 7, 8 will be shifted in parallel a distance corresponding to the length indicated by the arrows L′—L″. This translational movement of the journal 8 is supported by the thrust bearing 17 which is movable in the radial direction, in other words is radially floating.

In the adjustment positions impression-on of the plate cylinder 3, in which the plate cylinder 3 is in contact with the rubber cylinder 4, the thrust bearing 17 is approximately centered and the axial line L″—L″ of the plate cylinder and the axial line of the side register 15 coincide substantially with each other.

Figure 2:
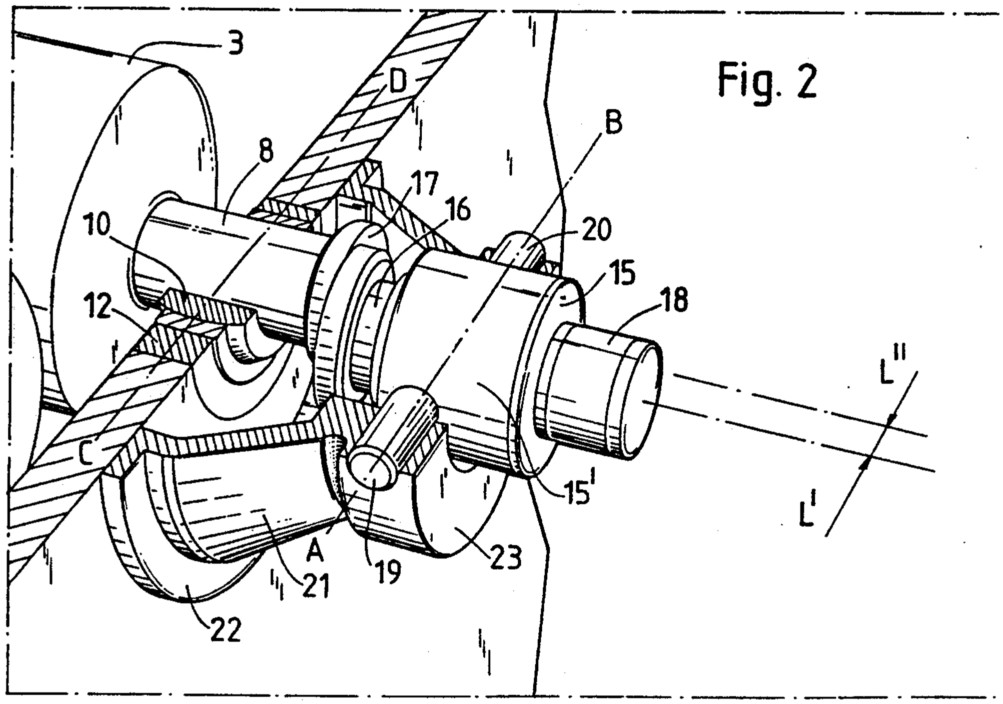
FIG. 2 is an enlarged perspective view of the device according to FIG. 1.

It appears from FIG. 2 that the holding means 21 has the shape of a cone frustrum shell comprising a first cylindric flange 23 in which pivots 19, 20 are arranged diametrically opposite each other. The pivots extend into bearing openings in the housing 15′ of the side register 15. The interrelation might be the opposite one, which means that the pivots 19, 20 might be anchored in the housing 15′ of the side register and extend into openings in the other cylindrical flange 23. It is thus obvious that the construction shown in FIG. 2 the pivots form the first bearing means whereas the bearing openings in the housing 15′ of the side register form second bearing means cooperating with the first ones.

It is thus obvious that the side register 15 is pendulum suspended in the holding means 21.

The pivots are in line with each other and their common axial line is designated A-B.

Figure 3:
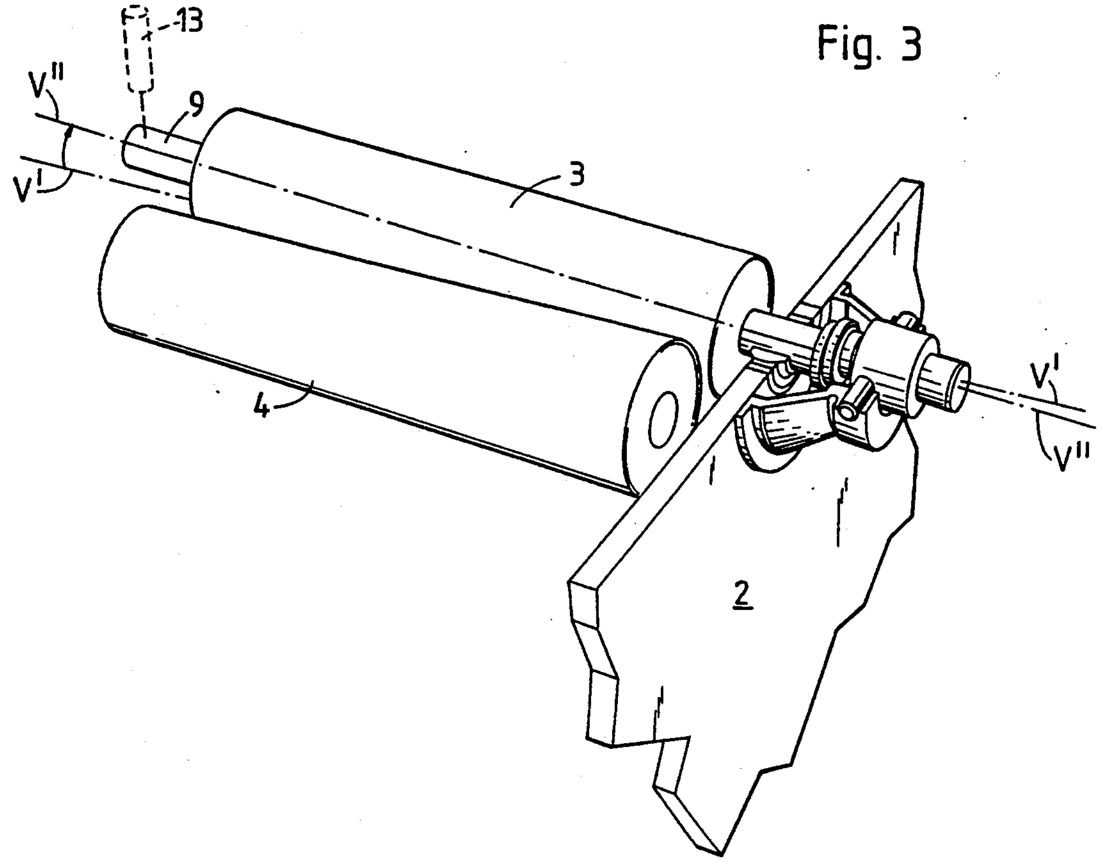
FIG. 3 shows the pair of cylinders according to FIG. 1 when the plate cylinder is inclined (=cocking-adjustment)
Figure 4:
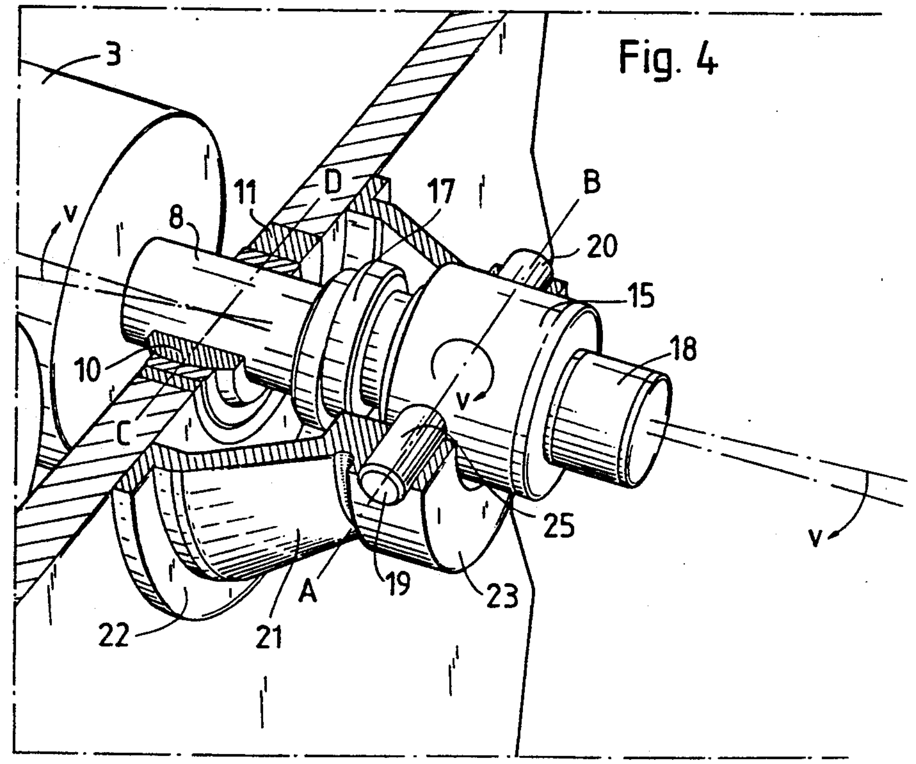
FIG. 4 is a perspective view at an enlarged scale of the device according to FIG. 3.

In FIGS. 3 and 4 the situation is shown in which the plate cylinder 3 has been tilted by activation of the hydraulic cylinder means 13. The plate cylinder has a cocking adjusting position. The envelope surface of the plate cylinder is still in contact with the envelope surface of the rubber cylinder along the whole length of the cylinders. Journal 9 has been shifted from the position V′ to the position V″. During this turning movement the spherical and eccentrically mounted ring means 11 adjusts itself automatically. The spherical bearings 9, 10 absorb the turning movements of the journals 7, 8 and the turning movement of journal 8 is absorbed in part by a shifting movement of the axially stiff but radially shiftable thrust bearing 17 in the same direction as the turning movement is performed. This shifting of the thrust bearing produces a corresponding turning movement of the side register 15 about the pivots 19, 20. The side register is turned in the same direction as the turning direction of journal 9. These turning directions are marked by arrows V in FIG. 4. Since the thrust bearing 17 has no axial play, it is important to realize that the side register 15 turns in the same direction as the journals do.

With the plate cylinder 3 in the position as shown in FIG. 4 it is obvious that the side register still can draw the plate cylinder out and in in the axial direction of the plate cylinder without introducing any bending in the axial bearing.

It is also obvious that the hydraulic cylinder unit 14 and the corresponding hydraulic cylinder unit (not shown) at the journal 8 may be activated synchronously and perform a parallel shift of the plate cylinder 3 from the impression-off position shown in FIG. 4 i.e. a translatory movement corresponding to the distance L′—L″ in FIG. 1 while the cocking adjustment position is maintained.

Figure 5:
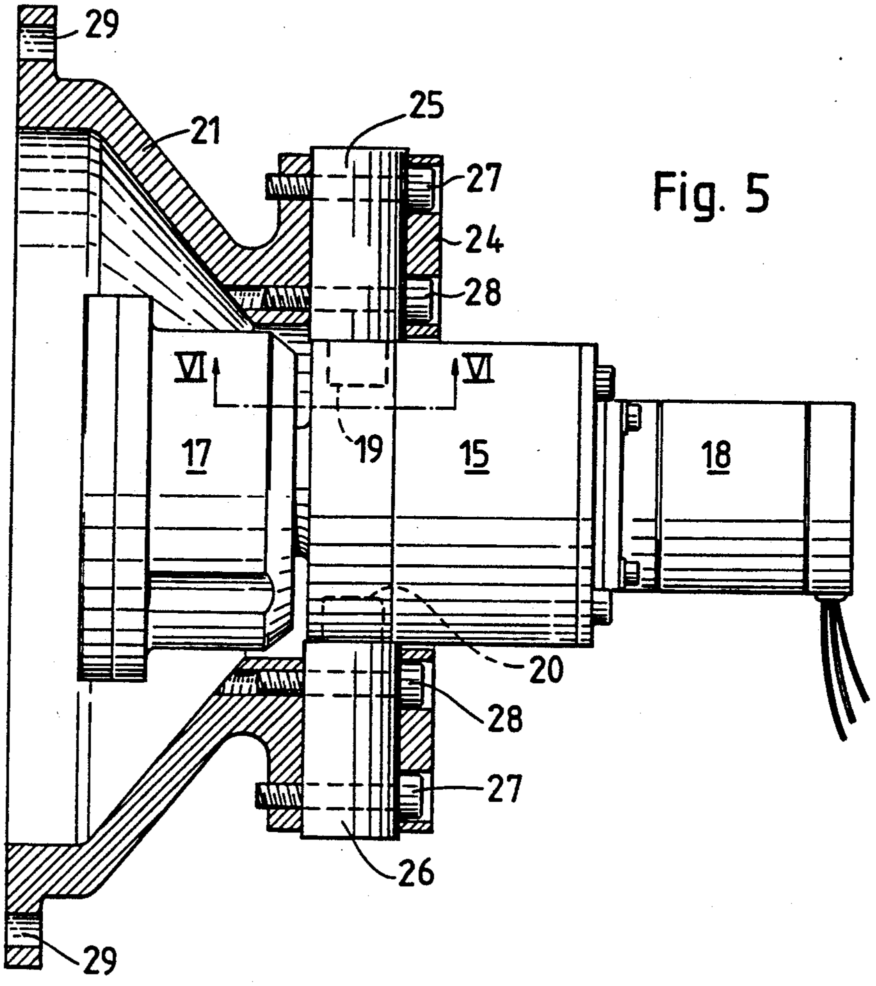
FIG. 5 is a cross-sectional view of the device according to the invention.
Figure 6:
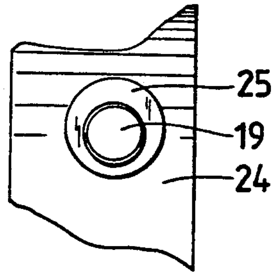
FIG. 6 is a plane view along the line VI—VI in FIG. 5

In order to avoid the introduction of bending forces into the thrust bearing 17 and side register 15 during the mounting of the side register it is important that the pivotal axis A-B of the pivots 19, 20 is exactly at right angles to the axial line L″—L″ of the plate cylinder 3. Such an exact alignment of the pivot axis of the pivots 19 and 20 is possible either by exact machining of the holding means 21 and its bores for the pivots 19, 20 as well by a corresponding exact machining of the bearing openings for the pivots in the side register. However, a more ingenious solution of this adjustment problem is to make the pivots 19, 20 eccentric, i.e. to provide each of the pivots 19, 20 which are supported in the side register with an eccentrically mounted cylindrical part 25, 26, said parts being received in and lockingly attached to the holding means 21 by means of locking screws 27, 28 as shown in FIG. 5.

In practice, the alignment is performed automatically by first mounting the thrust bearing 17 of the side register on journal 8. Thereby the axial line of the side register is in parallel with the axial line of the plate cylinder 3. By means of bolts (not shown) extending through openings 29 provided along the periphery of the first cylindrical flange 22 the holding means is thereafter firmly locked to the side wall 2. Thus the eccentrically mounted pivots will automatically adjust themselves in such a way that no tensions will appear in the thrust bearing 17.

FIG. 7 shows a longitudinal section of the side register 15. The motor 18 is attached by screws in one end wall 30 of the housing 15′ of the side register. The outgoing shaft of the motor is connected to an ingoing shaft 31 of a gear comprising a cog wheel 32 in meshing engagement with an internal cog wheel 33. This gear is of the type described in my patent document WO 88/005508. The slow meshing movement of the cog wheel 32 is transferred with the aid of a transmission element 33A, which is of the type described in my patent document WO 88/005509, into a slow turning movement of the outgoing shaft 16 of side register which is provided with an external thread 35 in threading engagement with a corresponding internal thread in the opposed end wall 36 of the housing 15′ of the side register. At this end wall 36 there are mutually opposed bearing openings 37A, 37B for the pivots 19, 20. The outgoing shaft 16 supports the thrust bearing 17 which in a known manner comprises two sets 38, 39 of balls or cylinders as well as three plates 40, 41, 42, the intermediate one 41 of which is a shaft plate at which the shaft 16 is anchored with the aid of a screw 43. The thrust bearing 17 is attached to the journal 8 by means of screws (not shown) disposed in openings 44 along the periphery of a flange 45. When the motor 18 rotates, its turning movement is also converted into an axial movement of the thrust bearing 17. The whole unit comprising the thrust bearing and side register has an axial play which at most will amount to some few μm.

The invention may be modified and varied in many ways within the frame of the attached patent claims.

What I claim is:

1. A bearing means for a linear adjusting device (15) for a cylinder (3), said cylinder having journals (7, 8) which by means of two bearings (9, 10) are mounted in a cylinder stand (1, 2), said linear adjusting device being provided with an outgoing linearly adjustable shaft (16), coupling means for coupling said outgoing shaft (16) of the adjusting device to one of said journals (8), said adjusting device permitting adjustment of the position of the cylinder laterally, i.e. axially of the cylinder, angular adjustment means, in which the bearing (9) is supported in the cylinder stand enabling the cylinder to be angularly adjusted in relation to the other cylinders in the press, characterized in that said coupling means comprises a radially floating, double-acting thrust-bearing (17) inserted between the outgoing shaft (16) of the adjusting device and said one journal (8), a holding means (21) attached to said cylinder stand and provided with first bearing means (19, 20) positioned opposite each other and spaced from each other, second bearing means (37A, B) disposed opposite each other on opposed sides of the housing (15') of the adjusting device, said first bearing means (19, 20) being provided in line with said second bearing means (37A, B) and cooperating therewith to form a pendulous suspension of the linear adjusting device in said holding means, aid pendulous suspension having a pendulum axis direction (A-B) which is substantially parallel to the axis (C-D) about which the cylinder (3) rotates during angular adjustment of the cylinder, enabling the linear adjusting device to be turned synchronously about the pendulum axis direction (A-B) and in the same direction as the cylinder (3) thus to prevent uneven load in said thrust bearing (17).

2. The bearing means as claimed in claim 1, in which the cylinder also performs a translatory movement in one plane substantially at right angles to the plane in which the angular adjustment of the cylinder takes place, characterized in that the thrust bearing (17) due to its radial mobility also permits such a translatory movement.

3. The bearing means as claimed in claim 2, characterized in that said first bearing means (19, 20) cooperating with said second bearing means (37A, B) are provided with eccentric means (25, 26) permitting automatic elimination of perpendicular alignment faults between the rotary axis (L"—L") of the cylinder and the pendulum axis direction (A-B) during the assemblage of the adjusting device.

4. The bearing means as claimed in claim 3, characterized in that the thrust bearing (17) is pretensioned.

5. The bearing means as claimed in claim 3, characterized in that said second bearing means are two bores (37A, B) in the housing (15') of the adjusting device and that said first bearing means are two pivot dowels (19, 20) anchored at said holding means (21).

6. The bearing means as claimed in claim 5, characterized by lock screws which after performance of an initial alignment of the adjusting device (15), such that the pendulum axis direction (A-B) will be perpendicular to the axial line (L'—L') of the cylinder, pass through said eccentric means (15, 16).

7. The bearing means as claimed in claim 2, characterized in that said second bearing means are two bores (37A, B) in the housing (15') of the adjusting device and that said first bearing means are two pivot dowels (19, 20) anchored at said holding means (21).

8. The bearing means as claimed in claim 7, characterized by lock screws which after performance of an initial alignment of the adjusting device (15), such that the pendulum axis direction (A-B) will be perpendicular to the axial line (L'-L') of the cylinder, pass through said eccentric means (25, 26).

9. The bearing means as claimed in claim 1, characterized in that said first bearing means (19, 20) cooperating with said second bearing means (37A, B) are provided with eccentric means (25, 26) permitting automatic elimination of perpendicular alignment faults between the rotary axis (L"—L") of the cylinder and the pendulum axis direction (A-B) during the assemblage of the adjusting device.

10. The bearing means as claimed in claim 9, characterized in that said second bearing means are two bores (37A, B) in the housing (5') of the adjusting device and that said first bearing means are two pivot dowels (19, 20) anchored at said holding means (21).

11. The bearing means as claimed in claim 10, characterized by lock screws which after performance of an initial alignment of the adjusting device (15), such that the pendulum axis direction (A-B) will be perpendicular to the axial line (L'—L') of the cylinder, pass through said eccentric means (25, 26).

12. The bearing means as claimed in claim 9, characterized in that the thrust bearing (17) is pretensioned.

13. The bearing means as claimed in claim 12, characterized in that said second bearing means are two bores (37A, B) in the housing (15') of the adjusting device and that said first bearing means are two pivot dowels (19, 20) anchored at said holding means (21).

14. The bearing means as claimed in claim 13, characterized by lock screws which after performance of an initial alignment of the adjusting device (15), such that the pendulum axis direction (A-B) will be perpendicular to the axial line (L'm—L') of the cylinder, pass through said eccentric means (25, 26).

15. The bearing means as claimed in claim 1, characterized in that said second bearing means are two bores (37A, B) in the housing (15') of the adjusting device and that said first bearing means are two pivot dowels (19, 20) anchored at said holding means (21).

16. The bearing means as claimed in claim 15, characterized by lock screws which after performance of an initial alignment of the adjusting device (15), such that the pendulum axis direction (A-B) will be perpendicular to the axial line L'—L') of the cylinder, pass through said eccentric means (25, 26).

* * * * *